United States Patent
Ohira et al.

(10) Patent No.: US 10,046,206 B2
(45) Date of Patent: Aug. 14, 2018

(54) GOLF BALL

(71) Applicant: Bridgestone Sports Co., Ltd., Minato-ku, Tokyo (JP)

(72) Inventors: Takashi Ohira, Chichibushi (JP); Tsuyoshi Nakajima, Chichibushi (JP); Eiji Takehana, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 15/634,005

(22) Filed: Jun. 27, 2017

(65) Prior Publication Data

US 2017/0361170 A1 Dec. 21, 2017

Related U.S. Application Data

(63) Continuation-in-part of application No. 15/624,476, filed on Jun. 15, 2017, which is a continuation of application No. 14/934,445, filed on Nov. 6, 2015, now Pat. No. 9,764,196, which is a continuation of application No. 14/016,801, filed on Sep. 3, 2013, now Pat. No. 9,211,445.

(51) Int. Cl.
*A63B 37/06* (2006.01)
*A63B 37/00* (2006.01)
*C08L 21/00* (2006.01)

(52) U.S. Cl.
CPC ........ *A63B 37/0051* (2013.01); *A63B 37/006* (2013.01); *A63B 37/0063* (2013.01); *A63B 37/0065* (2013.01); *A63B 37/0066* (2013.01); *A63B 37/0068* (2013.01); *A63B 37/0074* (2013.01); *A63B 37/0075* (2013.01); *A63B 37/0076* (2013.01); *C08L 21/00* (2013.01)

(58) Field of Classification Search
USPC .................................. 473/351–378
See application file for complete search history.

(56) References Cited

U.S. PATENT DOCUMENTS

| | | | | |
|---|---|---|---|---|
| 4,650,193 A * | 3/1987 | Molitor | ............... | A63B 37/0003 264/265 |
| 4,726,590 A * | 2/1988 | Molitor | ................. | A63B 37/02 473/372 |
| 5,731,371 A * | 3/1998 | Nesbitt | ................. | C08F 279/02 473/371 |
| 5,733,977 A * | 3/1998 | Takemura | .......... | A63B 37/0003 473/372 |
| 5,776,012 A * | 7/1998 | Moriyama | ......... | A63B 37/0003 473/372 |
| 5,816,944 A * | 10/1998 | Asakura | ............. | A63B 37/0003 473/372 |
| 5,929,171 A * | 7/1999 | Sano | .................. | A63B 37/0003 473/372 |
| 6,220,972 B1 * | 4/2001 | Sullivan | ............. | A63B 37/0003 473/373 |
| 6,602,941 B2 * | 8/2003 | Higuchi | ............. | A63B 37/0003 473/357 |
| 6,786,836 B2 * | 9/2004 | Higuchi | ............. | A63B 37/0003 473/351 |
| 6,835,779 B2 * | 12/2004 | Voorheis | ............ | A63B 37/0003 473/377 |
| 7,083,532 B2 * | 8/2006 | Ohama | .............. | A63B 37/0003 473/371 |
| 7,344,752 B2 * | 3/2008 | Zheng | ................... | C08F 257/02 264/4.1 |
| 7,455,602 B2 * | 11/2008 | Sato | ................... | A63B 37/0004 473/383 |
| 7,897,694 B2 * | 3/2011 | Rajagopalan | ...... | A63B 37/0003 473/371 |
| 8,007,374 B2 * | 8/2011 | Bartsch | .............. | A63B 37/0003 473/364 |
| 8,021,249 B2 * | 9/2011 | Higuchi | ............. | A63B 37/0004 473/384 |
| 8,367,779 B1 * | 2/2013 | Ozawa | ................... | C08K 5/098 525/331.9 |
| 8,648,133 B2 * | 2/2014 | Ozawa | ................... | C08K 5/405 473/372 |
| 8,802,788 B2 * | 8/2014 | Nakajima | ............. | C08K 5/175 473/351 |
| 9,162,113 B2 * | 10/2015 | Hwang | .................... | C08K 5/18 |
| 9,211,445 B2 * | 12/2015 | Nakajima | ............ | A63B 37/006 |
| 9,724,568 B2 * | 8/2017 | Yamazaki | .......... | A63B 37/0074 |
| 2003/0038399 A1 * | 2/2003 | Scolamiero | ......... | B29C 35/0222 264/236 |

(Continued)

FOREIGN PATENT DOCUMENTS

| | | |
|---|---|---|
| JP | 1085367 A | 4/1998 |
| JP | 2002102388 A | 4/2002 |
| JP | 2003126300 A | 5/2003 |

*Primary Examiner* — Alvin Hunter

(74) *Attorney, Agent, or Firm* — Sughrue Mion, PLLC

(57) ABSTRACT

The invention provides a golf ball that is a one-piece golf ball or a golf ball having a core and a cover of one layer or a plurality of layers, wherein the one-piece golf ball or core is formed of a material molded under heat from a rubber composition containing:

(A) a base rubber, (B) an organic peroxide, (C) water, (D) a metal methacrylate and (E) zinc oxide.

The content of component (D) per 100 parts by weight of component (A) is from 30 to 45 parts by weight. The molar ratio (C)/(D) between components (C) and (D) satisfies the formula $$0.9 < (C)/(D) < 1.1.$$

The core has an initial velocity $V_0$ of at least 72.0 m/s and up to 75.0 m/s.

5 Claims, No Drawings

(56) References Cited

U.S. PATENT DOCUMENTS

| | | | | |
|---|---|---|---|---|
| 2003/0100383 A1* | 5/2003 | Jordan | ............... | A63B 37/0003 |
| | | | | 473/371 |
| 2004/0214661 A1* | 10/2004 | Sullivan | ............. | A63B 37/0003 |
| | | | | 473/371 |
| 2005/0004325 A1* | 1/2005 | Wu | ........................ | A63B 37/00 |
| | | | | 525/462 |
| 2005/0154132 A1* | 7/2005 | Hakuta | ................ | C08K 5/0025 |
| | | | | 525/105 |
| 2006/0073913 A1* | 4/2006 | Castner | ............. | A63B 37/0003 |
| | | | | 473/371 |

* cited by examiner

GOLF BALL

CROSS-REFERENCE TO RELATED APPLICATION

This application is a continuation-in-part of copending application Ser. No. 15/624,476 filed on Jun. 15, 2017 which is a continuation application of U.S. patent application Ser. No. 14/934,445 (now is in the condition of an allowance), which is a continuation of U.S. patent application Ser. No. 14/016,801, now U.S. Pat. No. 9,211,445, the entire contents of each of which are hereby incorporated by reference.

BACKGROUND OF THE INVENTION

The present invention relates to a one-piece golf ball or a golf ball having a core and a cover of one layer or a plurality of layers. More particularly, the invention relates to a golf ball which is suitable for use as a practice golf ball.

Because sufficient durability cannot be achieved when zinc methacrylate is used in a rubber composition for practice golf ball cores, JP-A 2012-228452 discloses compounding that uses methacrylic acid instead. However, methacrylic acid, as an acid, has the power to corrode metal, making it essential to design the manufacturing facility to acidproof specifications and thus necessitating, in this and other ways, capital investments. Also, worker safety must be taken into account in the manufacturing processes, all of which is very burdensome for production.

JP-A H10-85367 discloses art that holds down the decrease in core resilience by minimizing the moisture present in golf ball rubber compositions.

Conversely, JP-A 2002-102388 describes the addition of moistened rubber powder to a rubber composition as one way to inexpensively lower the resilience of practice golf balls.

The above prior art discusses methods for lowering rebound and techniques for maintaining a high durability. However, no mention whatsoever is made in this prior art of being able to lower the burden on production facilities and ensure good productivity.

SUMMARY OF THE INVENTION

It is therefore an object of the present invention to provide a golf ball which maintains a very high durability, undergoes little decrease in rebound over time, and moreover can reduce the burden on the production facilities and thus ensure a good productivity.

As a result of extensive investigations, the inventors have discovered a method that uses as the core a material molded under heat from a rubber composition which includes (A) a base rubber, (B) an organic peroxide, (C) water, (D) a metal methacrylate and (E) zinc oxide, and thereby safely obtains, without requiring large capital investments, a core material that does not readily crack and undergoes little decrease in resilience over time. Moreover, the inventors have found that when this core material is used as an overall one-piece golf ball or is employed as the core in a golf ball, the resulting golf ball has an excellent durability and undergoes little change in its properties during long-term use.

In the golf ball of the invention, the core is formed of a material molded under heat from a rubber composition which includes (A) a base rubber, (B) an organic peroxide, (C) water, (D) a metal methacrylate and (E) zinc oxide. Preferably, by suitably controlling the internal hardness difference between the center and the surface of the core, a golf ball which has an excellent durability and undergoes little change in resilience even with long-term use can be provided.

Accordingly, the invention provides the following golf ball.

[1] A golf ball that is a one-piece golf ball or a golf ball having a core and a cover of one layer or a plurality of layers, wherein the one-piece golf ball or core is formed of a material molded under heat from a rubber composition containing the following components (A) to (E):

(A) a base rubber,
(B) an organic peroxide,
(C) water,
(D) a metal methacrylate, and
(E) zinc oxide, the content of component (D) per 100 parts by weight of component (A) is from 30 to 45 parts by weight, the molar ratio (C)/(D) between components (C) and (D) satisfies the following formula $$0.9 < (C)/(D) < 1.1,$$

and the core has an initial velocity $V_0$ of at least 72.0 m/s and up to 75.0 m/s.

[2] The golf ball of [1] wherein, letting $V_0$ be the initial velocity of the core in a golf ball after the cover has been molded, as measured after peeling away the cover, and letting $V_{60}$ be the initial velocity of the core measured 60 days after measuring $V_0$, $(V_0 - V_{60}) \leq 0.8$.

[3] The golf ball of [1], wherein the JIS-C hardness difference obtained by subtracting the hardness at a center of the core from the hardness at a surface of the core is at least 4 and up to 20.

[4] The golf ball of [1] which is a golf ball having a cover of one layer or a plurality of layers, wherein at least one cover layer is formed primarily of polyurethane resin.

[5] The golf ball of [1] wherein, when the core is heated at 300° C. the gases that volatilize therefrom are free of methacrylic acid.

DETAILED DESCRIPTION OF THE INVENTION

The invention is described more fully below.

The golf ball of the invention is a one-piece golf ball or a golf ball having a core and a cover of one layer or a plurality of layers, wherein the one-piece golf ball or the core is formed of a material molded under heat from a rubber composition comprising the following components (A) to (E):

(A) a base rubber,
(B) an organic peroxide,
(C) water,
(D) a metal methacrylate, and
(E) zinc oxide.

The base rubber serving as component (A) is not particularly limited, although the use of polybutadiene is especially preferred.

It is desirable for the polybutadiene to have a cis-1,4 bond content on the polymer chain of at least 60 wt %, preferably at least 80 wt %, more preferably at least 90 wt 6, and most preferably at least 95 wt %. If the content of cis-1,4 bonds among the bonds on the polybutadiene molecule is too low, the resilience may decrease.

The content of 1,2-vinyl bonds included on the polybutadiene is typically not more than 2%, preferably not more than 1.7%, and more preferably not more than 1.5%, of the polymer chain. If the content of 1,2-vinyl bonds is too high, the resilience may decrease.

The polybutadiene has a Mooney viscosity ($ML_{1+4}$ (100° C.)) of preferably at least 20, and more preferably at least 30, with the upper limit being preferably not more than 120, more preferably not more than 100, and even more preferably not more than 80.

The term "Mooney viscosity" used herein refers to an industrial indicator of viscosity (JIS K6300) measured with a Mooney viscometer, which is a type of rotary plastometer. This value is represented by the unit symbol $ML_{1+4}$ (100° C.), wherein "M" stands for Mooney viscosity, "L" stands for large rotor (L-type), and "1+4" stands for a pre-heating time of 1 minute and a rotor rotation time of 4 minutes. The "100° C." indicates that measurement was carried out at a temperature of 100° C.

The polybutadiene used may be one synthesized using a rare-earth catalyst or a group VIII metal compound catalyst. In this invention, the use of a polybutadiene synthesized with a rare-earth catalyst is especially preferred. Where necessary, an organoaluminum compound, an alumoxane, a halogen-containing compound and a Lewis base may be optionally used in combination with such a catalyst. In the practice of the invention, preferred use may be made of, as the various foregoing compounds, those mentioned in JP-A H11-35633.

Of the above rare-earth catalysts, the use of a neodymium catalyst that uses in particular a neodymium compound, which is a lanthanum series rare-earth compound, is especially recommended. In such cases, a polybutadiene rubber having a high cis-1,4 bond content and a low 1,2-vinyl bond content can be obtained at an excellent polymerization activity.

A polybutadiene rubber synthesized with a catalyst differing from the above lanthanum rare-earth compound may be included in the base rubber. In addition, styrene-butadiene rubber (SBR), natural rubber, polyisoprene rubber, ethylene-propylene-diene rubber (EPDM) or the like may also be included. These may be used singly or two or more may be used in combination.

The organic peroxide (B) used in the invention is not particularly limited, although the use of an organic peroxide having a one-minute half-life temperature of 110 to 185° C. is preferred. A single organic peroxide, or two or more organic peroxides, may be used. The amount of organic peroxide included per 100 parts by weight of the base rubber is preferably at least 0.1 part by weight, and more preferably at least 0.3 part by weight. The upper limit is preferably not more than 5 parts by weight, more preferably not more than 4 parts by weight, and even more preferably not more than 3 parts by weight. A commercial product may be used as the organic peroxide. Specific examples include those available under the trade names Percumyl D, Perhexa C-40, Niper BW and Peroyl L (all produced by NOF Corporation), and Luperco 231XL (from Atochem Co.).

In this invention, by directly including water (inclusive of water-containing materials) as component (C) in the core material, some of the zinc methacrylate in the core composition ionizes, causing the vulcanization reaction to begin from this state and thereby enabling a tougher vulcanizate to be obtained. In addition, water also has the property of promoting decomposition of the organic peroxide; at high temperatures, vulcanization proceeds too far and the amount of decomposed radicals ends up rising excessively, leading to recombination between radicals and, ultimately, deactivation. As a result, fewer radicals act effectively in cross-linking. The vicinity of the core surface is maintained at substantially the same temperature as the temperature of the vulcanization mold. However, the temperature near the core center, due to the build-up of heat of decomposition by the organic peroxide that has decomposed from the outside, becomes considerably higher than the mold temperature. Decomposition of the organic peroxide is promoted by the water, as a result of which the hardness at the center of the core tends to be lower than in conventional core formulations. Also, a core having a larger than necessary inner-outer hardness difference is disadvantageous in terms of durability. Hence, there is a need to control vulcanization at a suitable temperature.

The water serving as component (C) is not particularly limited, and may be distilled water or may be tap water. The use of distilled water that is free of impurities is especially preferred. The amount of water included per 100 parts by weight of the base rubber is preferably at least 1 part by weight, and more preferably at least 2 parts by weight. The upper limit is preferably not more than 5 parts by weight, and more preferably not more than 3.5 parts by weight. When the amount of water added to the rubber composition is too low, it may not be possible to keep the initial velocity low. When the amount of water added is too high, the core may become too soft, the core initial velocity may decrease more than necessary, and there may be an adverse effect on the durability.

Although it is also possible to add water directly to the rubber composition, the following methods (i) to (iii) may be employed to incorporate water:

(i) applying water as steam, or in the form of a mist by means of ultrasound, to some or all of the rubber composition (compounded material);

(ii) immersing some or all of the rubber composition in water;

(iii) letting some or all of the rubber composition stand for a given period of time in a high-humidity environment in a place where the humidity can be controlled, such as a constant humidity chamber.

As used herein, "high-humidity environment" is not particularly limited, so long as it is an environment capable of moistening the rubber composition, although a humidity of from 40 to 100% is preferred.

Alternatively, the water may be worked into a jelly state and added to the above rubber composition. Or a material obtained by first supporting water on a filler, unvulcanized rubber, rubber powder or the like may be added to the rubber composition. In such a form, the workability is better than when water is directly added to the composition, enabling the efficiency of golf ball production to be increased. The type of material in which a given amount of water has been included, although not particularly limited, is exemplified by fillers, unvulcanized rubbers and rubber powders in which sufficient water has been included. The use of a material which undergoes no loss of durability or resilience is especially preferred. The moisture content of the above material is preferably at least 3 wt %, more preferably at least 5 wt %, and even more preferably at least 10 wt %. The upper limit is preferably not more than 99 wt %, and even more preferably not more than 95 wt %.

In addition to above-described components (A) to (C), the rubber composition also includes (D) a metal methacrylate and (E) zinc oxide. If necessary, antioxidants and other compounding ingredients may also be included. These ingredients are described in detail below.

(D) Metal Methacrylate

Metal salts of unsaturated carboxylic acids may be used as one type of co-crosslinking agent. In this invention, methacrylic acid is used as an α,β-unsaturated carboxylic acid, and zinc is used as the metal of the metal salt.

The zinc methacrylate serving as component (D) has an average particle size of preferably from 3 to 30 μm, more preferably from 5 to 25 μm, and even more preferably from 8 to 15 μm. At an average particle size for zinc methacrylate below 3 μm, the zinc methacrylate tends to agglomerate in the rubber composition; at an average particle size greater than 30 μm, the co-crosslinking agent particles become too large, resulting in a larger variability in the properties of the resulting golf balls. The content of the zinc methacrylate serving as component (D) is from 30 to 45 parts by weight per 100 parts by weight of the base rubber. At a content lower than the above range, the durability worsens or the core becomes too soft; at a content higher than this range, the durability worsens or the core becomes too hard, giving the ball a poor feel at impact.

It is critical for the molar ratio (C)/(D) between components (C) and (D) to satisfy the following formula.

$$0.9 < (C)/(D) < 1.1$$

When the molar ratio falls outside of this range, the durability of the golf ball worsens.

(E) Zinc Oxide

Zinc oxide is used in this invention as one type of inert filler. The use of zinc oxide in the invention is essential, but other inert fillers, including inorganic fillers such as barium sulfate and calcium carbonate, may be optionally used together with the zinc oxide. The content of the zinc oxide serving as component (E) per 100 parts by weight of the base rubber is preferably at least 1 part by weight, more preferably at least 3 parts by weight, and even more preferably at least 5 parts by weight. The upper limit is preferably 60 parts by weight or less, more preferably 40 parts by weight or less, even more preferably 30 parts by weight or less, and most preferably 15 parts by weight or less.

In this invention, an antioxidant may be optionally included in the rubber composition. For example, use may be made of a commercial product such as Nocrac NS-6, Nocrac NS-30 or Nocrac 200 (all products of Ouchi Shinko Chemical Industry Co., Ltd.). These may be used singly or two or more may be used in combination. The amount of antioxidant included is not particularly limited, and may be set to preferably at least 0.1 part by weight, and more preferably at least 0.15 part by weight, per 100 parts by weight of the base rubber. The upper limit may be set to preferably not more than 5.0 parts by weight, more preferably not more than 4.0 parts by weight, and even more preferably not more than 3.0 parts by weight. If too much or too little antioxidant is included, an optimal core hardness gradient may not be obtained, which may make it impossible to achieve a good rebound, durability and spin rate-lowering effect on full shots.

The core in this invention can be obtained by using a method similar to that employed with conventional golf ball rubber compositions to vulcanize and cure the above-described rubber composition. Exemplary vulcanization conditions include a vulcanization temperature of between 140 and 200° C., preferably between 150 and 180° C. and a vulcanization time of from 5 to 40 minutes.

It is recommended that the core diameter be preferably at least 30 mm, more preferably at least 33 mm, and even more preferably at least 35 mm, with the upper limit being preferably not more than 41 mm, more preferably not more than 40.5 mm, and even more preferably not more than 40 mm. When the core diameter is smaller than the above value, it may not be possible to obtain a sufficient resilience. On the other hand, when the core diameter is larger than the above value, a sufficient spin rate-lowering effect may not be obtainable, in addition to which it may not be possible to obtain the advantageous effects imparted by the cover. In the case of one-piece golf balls, in accordance with the Rules of Golf as they apply to golf balls, it is reasonable for the diameter to be set to at least 42.67 mm and not more than about 45 mm, although the diameter is not limited to this range.

It is recommended that the core (material molded under heat) have a deflection, when compressed under a final load of 1,275 N (130 kgf) from an initial load of 98 N (10 kgf), of preferably at least 2.3 mm, and more preferably at least 2.4 mm, with the upper limit being preferably not more than 3.5 mm, and more preferably not more than 3.4 mm. When the core deflection is too much larger than the above value, the core may be too soft, as a result of which the resilience may decrease and the ball may have a dead feel at impact. On the other hand, when the core deflection is too much smaller than the above value, the ball may have a hard feel at impact, which may be a strain on the hands when taking repeated shots during practice.

Next, the core hardness is described.

The core has a center hardness expressed in terms of JIS-C hardness which, although not particularly limited, is preferably at least 45, and more preferably at least 50, with the upper limit being preferably not more than 70, and more preferably not more than 65. Outside of this range in the center hardness of the core, the ball may have a hard feel at impact or the durability may decrease.

The core has a surface hardness expressed in terms of JIS-C hardness which, although not particularly limited, is preferably at least 65, and more preferably at least 70, with the upper limit being preferably not more than 90, and more preferably not more than 85. When the surface hardness of the core becomes higher than this range, the durability to cracking on repeated impact worsens.

The JIS hardness difference value obtained by subtracting the core center hardness from the core surface hardness, expressed as [(core surface hardness)−(core center hardness)], has an influence on the durability to cracking and thus is preferably at least 4, and more preferably at least 6, with the upper limit being preferably not more than 25, and more preferably not more than 20. When the hardness difference is too large, the ball durability to cracking on repeated impact worsens. The center hardness refers herein to the hardness measured at the center on a cross-section obtained by cutting the core in half (through the center), and the surface hardness refers to the hardness measured at the core surface (spherical surface). Also, "JIS-C hardness" refers to the hardness measured with the spring-type durometer (JIS-C model) specified in JIS K 6301-1975.

Letting $V_0$ be the initial velocity of the core measured after removing the cover from a ball obtained by molding a cover material over a core and letting $V_{60}$ be the initial velocity of the core measured 60 days after the day on which $V_0$ was measured, $V_0$ is at least 72.0 m/s, with the upper limit being 75.0 m/s or less, and preferably 74.0 m/s. $V_{60}$ is preferably not much lower than $V_0$. In practice golf balls, it is preferable to adjust the core initial velocity within the range of 72.0 to 75.0 m/s. The same applies to one-piece golf balls.

The value $V_0 - V_{60}$ preferably satisfies the relationship $$V_0 - V_{60} < 0.9, \text{ and}$$

more preferably satisfies the relationship $$V_0 - V_{60} < 0.8.$$

In this invention, when moisture has been included in a good balance within the core, even if the core comes directly into contact with the atmosphere, it is not readily influenced by the humidity, enabling changes in the core initial velocity to be suppressed.

The initial velocity of the core may be measured using an initial velocity measuring apparatus of the same type as the USGA drum rotation-type initial velocity instrument approved by the R&A. In such cases, the core may be tested in a chamber at a room temperature of 23±2° C. after being held isothermally in a 23±1° C. environment for at least 3 hours.

When the core is heated at 300° C., it is preferable for the gases that volatilize therefrom to be free of methacrylic acid. That is, at the time of core vulcanization, the temperature in the vicinity of the core center sometimes reaches about 250° C.; it is preferable that methacrylic acid not be detected near this temperature. Methacrylic acid, as an acid, has the power to corrode metal. But if methacrylic acid is not detected, there is no need to design facilities to acidproof specifications, which is industrially advantageous.

Next, the cover of one layer or a plurality of layers that encases the core is described.

The cover material is not particularly limited, although use may be made of various types of materials that are used in golf balls, such as ionomeric resins and polyurethane resins (e.g., thermoplastic urethane elastomers). From the standpoint of durability, the material making up the outermost layer of the cover is preferably composed chiefly of a polyurethane resin, especially a thermoplastic urethane elastomer.

To obtain the cover in this invention, use may be made of, for example, a method that involves placing within a mold a single-layer core or a multilayer core of two or more layers that has been prefabricated according to the type of ball, mixing and melting the cover material under applied heat, and injection-molding the molten mixture over the core so as to encase the core with the desired cover. The cover producing operations in this case can be carried out in a state where excellent thermal stability, flowability and processability are achieved. As a result, the golf ball ultimately obtained has a high rebound, and moreover has a good feel at impact and excellent durability and scuff resistance. Alternatively, use may be made of a cover-forming method other than the foregoing, such as one in which, for example, a pair of hemispherical half-cups are molded beforehand from the cover material of the invention, following which the core is enclosed within the half-cups and molding is carried out under applied pressure at 120 to 170° C. for 1 to 5 minutes.

When the cover has only one layer, the thickness of that layer may be set to from 0.3 to 3 mm. When the cover has two layers, the thickness of the outer cover layer may be set to from 0.3 to 2.0 mm and the thickness of the inner cover layer may be set to from 0.3 to 2.0 mm. The Shore D hardnesses of the respective layers making up the cover (cover layers), although not particularly limited, are preferably at least 40, and more preferably at least 42. The upper limit is preferably not more than 67, and more preferably not more than 65.

Numerous dimples are formed on the surface of the outermost layer of the cover, in addition to which the cover may be subjected to various types of treatment, such as surface preparation, stamping and painting. Particularly in cases where such surface treatment is imparted to the cover formed of the inventive cover material, the good moldability of the cover surface enables surface treatment to be carried out effectively.

The invention provides a golf ball in which the above-described rubber composition is used as the golf ball proper (i.e., a one-piece golf ball), or a golf ball in which it is used as the core material for at least one core layer. With regard to the type of golf ball, this rubber composition may be used in, for example, solid golf balls such as one-piece golf balls, two-piece solid golf balls and multi-piece golf balls having a construction of three or more layers.

As described above, the golf ball of the invention undergoes little decrease in resilience over time and maintains a very high durability, in addition to which it places little burden on the equipment used in production, thus ensuring a good productivity.

EXAMPLES

Examples of the invention and Comparative Examples are given below by way of illustration, although the invention is not limited by the following Examples.

Examples 1 to 4, Comparative Examples 1 to 5

Cores having a diameter of 39.9 mm were produced by preparing the core rubber compositions composed primarily of polybutadiene shown in Table 1 below, and then molding and vulcanizing the compositions at 170° C. for 25 minutes.

TABLE 1

| (pbw) | | Working Example | | | | Comparative Example | | | | |
|---|---|---|---|---|---|---|---|---|---|---|
| | | 1 | 2 | 3 | 4 | 1 | 2 | 3 | 4 | 5 |
| (A) | Polybutadiene | 100 | 100 | 100 | 100 | 100 | 100 | 100 | 100 | 100 |
| (B) | Organic peroxide | 0.8 | 0.8 | 0.8 | 0.8 | 0.8 | 0.8 | 0.8 | 0.8 | 0.8 |
| (C) | Water | 2.4 | 2.4 | 2.9 | 3.3 | 3.7 | 1.2 | — | — | 2.0 |
| (D) | Zinc methacrylate | 34.0 | 34.0 | 38.5 | 44.0 | 48.0 | 34.0 | | 42.0 | 26.0 |
| | Methacrylic acid | | | | | | | 23.0 | | |
| (E) | Zinc oxide | 10.8 | 12.0 | 10.3 | 9.7 | 9.7 | 10.8 | 23.5 | 9.45 | 11.7 |
| | Antioxidant | 0.2 | 0.2 | 0.2 | 0.2 | 0.2 | 0.2 | 0.2 | 0.2 | 0.2 |

Details on the above ingredients are given below.
Polybutadiene: Available from JSR Corporation under the trade name "BR 01"; polymerized with a nickel-based catalyst.
Organic Peroxide: Dicumyl peroxide, available from NOF Corporation under the trade name "Percumyl D"

Water: Distilled water, from Wako Pure Chemical Industries, Ltd.

Zinc methacrylate: Available from Asada Chemical Industry Co., Ltd.

Methacrylic acid: Available from Evonik

Zinc oxide: Available under the trade name "Zinc Oxide Grade 3" (Sakai Chemical Co., Ltd.)

Antioxidant: Available from Ouchi Shinko Chemical Industry Co., Ltd. under the trade name "Nocrac NS-6"

Each of the cores produced as described above was evaluated for deformation under specific loading, hardness profile, and both the initial velocity at first as well as the initial velocity after standing of the core.

Deflection of Core Under Specific Loading

The deflection by the core when compressed under a final load of 1,275 N (130 kgf) from an initial load state of 98 N (10 kgf) was measured. The average value for 30 cores (n=30) is shown in Table 2.

Core Hardness Profile

The indenter of a durometer was set so as to be substantially perpendicular to the spherical surface of the core, and the core surface hardness in terms of JIS-C hardness was measured as specified in JIS K6301-1975.

To obtain the hardness at the center of the core, the core was cut in half through the center with a fine cutter, and the JIS-C hardness at the center of the cross-section was measured.

Core Initial Velocity $V_0$ and Initial Velocity $V_{60}$ after 60 Days of Standing A core was prepared by peeling the cover from a golf ball. $V_0$ was measured on the day that the cover was removed (Day 0), and $V_{60}$ was measured 60 days later, during which time the core was left to stand in a chamber held at room temperature (24° C.) and 40% humidity. The initial velocity was measured using an initial velocity measuring apparatus of the same type as the USGA drum rotation-type initial velocity instrument approved by the R&A. The core was tested in a chamber at a room temperature of 23±2° C. after being held isothermally in a 23±1° C. environment for at least 3 hours. Twenty cores were each hit twice, and the time taken for the core to traverse a distance of 6.28 ft (1.91 m) was measured and used to compute the initial velocity (m/s). This cycle was carried out over a period of about 15 minutes.

Detection of Volatile Acid Constituents from Core

Using a gas chromatograph mass spectrometer (GC/MS) equipped with a pyrolyzer, 0.1 mg of a test specimen cut from the core was placed in the pyrolyzer and heated at 300° C., and the volatilized gases were passed through the GC/MS and analyzed. The presence or absence of detected volatile acid constituents was noted in Table 2.

Next, for each of the cores produced as described above, using a polyurethane elastomer (available under the trade name "Pandex T8195" from DIC Covestro Polymer Ltd.) as the cover (outer layer) resin material, a cover having a thickness of 1.4 mm was injection-molded over the core, thereby obtaining a two-piece solid golf ball having a two-layer construction. Although not shown in a diagram, dimples in a specific pattern common to each ball were formed on the surface of the ball cover in all of the Working Examples and Comparative Examples.

The properties of the golf balls in these Working Examples and Comparative Examples were evaluated as follows. The results are presented in Table 2.

Ball Deformation Under Loading (mm)

The deformation (mm) by the golf ball when compressed under a final load of 1,275 N (130 kgf) from an initial load state of 98 N (10 kgf) was measured.

The ball initial velocity was measured using the same instrument and under the same conditions as described above for measurement of the core initial velocity.

Feel of Ball at Impact

Using a W#1 golf club, sensory evaluations were carried out under the following criteria by ten amateur golfers having head speeds of 35 to 40 m/s.

Good: Seven or more of the ten golfers experienced a good feel at impact

Fair: Five or six of the ten golfers experienced a good feel at impact

NG: Four or fewer of the ten golfers experienced a good feel at impact

Durability of Ball

The durability of the golf ball was evaluated using an ADC Ball COR Durability Tester produced by Automated Design Corporation (U.S.). This tester fires a golf ball pneumatically and causes it to repeatedly strike two metal plates arranged in parallel. The incident velocity against the metal plates was set to 43 m/s. The number of shots required for the golf ball to crack was measured, and the average value obtained from measurements for five golf balls (N=5) was determined.

Good: 1,000 shots or more

Fair: at least 500 but fewer than 1,000 shots

NG: fewer than 500 shots

TABLE 2

| | | Working Example | | | | Comparative Example | | | | |
|---|---|---|---|---|---|---|---|---|---|---|
| | | 1 | 2 | 3 | 4 | 1 | 2 | 3 | 4 | 5 |
| Core formulation | C (mol) | 0.13 | 0.13 | 0.16 | 0.18 | 0.21 | 0.07 | — | — | 0.11 |
| | D (mol) | 0.14 | 0.14 | 0.16 | 0.19 | 0.20 | 0.14 | — | 0.18 | 0.11 |
| (C/D) | C/D (molar ratio) | 0.92 | 0.92 | 0.99 | 0.98 | 1.01 | 0.46 | — | — | 1.01 |
| Core properties | Deformation under load (mm) | 3.25 | 3.02 | 2.89 | 2.45 | 2.10 | 4.80 | 2.80 | 2.92 | 3.90 |
| | Core initial velocity [$V_0$], m/s | 74.42 | 73.99 | 73.90 | 73.30 | 73.00 | 74.72 | 74.40 | 75.47 | 75.30 |
| | Core initial velocity [$V_{60}$], m/s | 73.68 | 73.25 | 73.12 | 72.50 | 72.40 | 73.63 | 73.67 | 74.12 | 74.65 |
| | Initial velocity difference [$V_0 - V_{60}$], m/s | 0.74 | 0.74 | 0.78 | 0.8 | 0.6 | 1.09 | 0.73 | 1.35 | 0.65 |
| Core hardness profile | Surface hardness (JIS-C) | 75 | 74 | 78 | 79 | 80 | 69 | 74 | 75 | 72 |
| | Center hardness (JIS-C) | 57 | 58 | 64 | 63 | 62 | 54 | 68 | 64 | 59 |
| | Surface hardness − Center hardness | 18 | 16 | 14 | 16 | 18 | 15 | 6 | 11 | 13 |
| | Detection of volatile acid constituents from core (GC) | no | no | no | no | no | no | yes | no | no |
| Ball properties | Deformation under loading (mm) | 3.25 | 3.00 | 2.88 | 2.45 | 2.10 | 4.78 | 2.80 | 2.93 | 3.90 |
| | Initial velocity (m/s) | 73.65 | 73.25 | 73.15 | 72.30 | 72.10 | 73.95 | 73.17 | 74.72 | 74.50 |
| | Feel at impact | Good | Good | Good | Good | NG (hard) | NG (soft) | Good | Good | NG (soft) |
| | Durability | Good | Good | Good | Good | Good | NG | Good | Good | Fair |

The above results demonstrate that the golf balls of Working Examples 1 to 4 had a good feel at impact, maintained a very high durability, underwent little decrease in resilience over time and, because volatile acid constituents were not detected, do not require manufacturing facilities to be designed to acidproof specifications and thus place little burden on the production facilities.

By contrast, Comparative Example 1 is an example in which the core formulation includes a large amount of the zinc methacrylate serving as component (C) of the invention. As a result, the golf ball had a harder feel at impact.

In Comparative Example 2, the molar ratio (C)/(D) between components (C) and (D) in the core formulation is lower than 0.9 (the lower limit value for (C)/(D) in the invention). As a result, the golf ball had a poor durability.

Comparative Example 3 is an example in which methacrylic acid is included in the core formulation. Unlike the core formulation according to the invention where water and zinc methacrylate are included as components (C) and (D), respectively, an acid gas was generated within the production processes, making acid-proofed equipment necessary.

Comparative Example 4 does not include the zinc methacrylate serving as component (C) in the invention. As a result, the core initial velocity was large and the ball traveled too far, making it unsuitable for use as a practice golf ball. Comparative Example 5 is an example in which the core formulation has a low level of the zinc methacrylate serving as component (C) in the invention. As a result, the golf ball had a soft feel at impact and the ball durability was somewhat poor.

The invention claimed is:

1. A golf ball comprising a one-piece golf ball or a golf ball having a core and a cover of one layer or a plurality of layers, wherein the one-piece golf ball or core is formed of a material molded under heat from a rubber composition comprising the following components (A) to (E):

(A) a base rubber, (B) an organic peroxide, (C) water, (D) a metal methacrylate, and (E) zinc oxide, the content of component (D) per 100 parts by weight of component (A) is from 30 to 45 parts by weight, the molar ratio (C)/(D) between components (C) and (D) satisfies the following formula $$0.9 < (C)/(D) < 1.1,$$

and the core has an initial velocity $V_0$ of at least 72.0 m/s and up to 75.0 m/s.

2. The golf ball of claim 1 wherein, letting $V_0$ be the initial velocity of the core in a golf ball after the cover has been molded, as measured after peeling away the cover, and letting $V_{60}$ be the initial velocity of the core measured 60 days after measuring $V_0$, $(V_0 - V_{60}) \leq 0.8$.

3. The golf ball of claim 1, wherein the JIS-C hardness difference obtained by subtracting the hardness at a center of the core from the hardness at a surface of the core is at least 4 and up to 20.

4. The golf ball of claim 1 which is a golf ball having a cover of one layer or a plurality of layers, wherein at least one cover layer is formed primarily of polyurethane resin.

5. The golf ball of claim 1 wherein, when the core is heated at 300° C., the gases that volatilize therefrom are free of methacrylic acid.

* * * * *